Inventor
Julien A. Gehrung

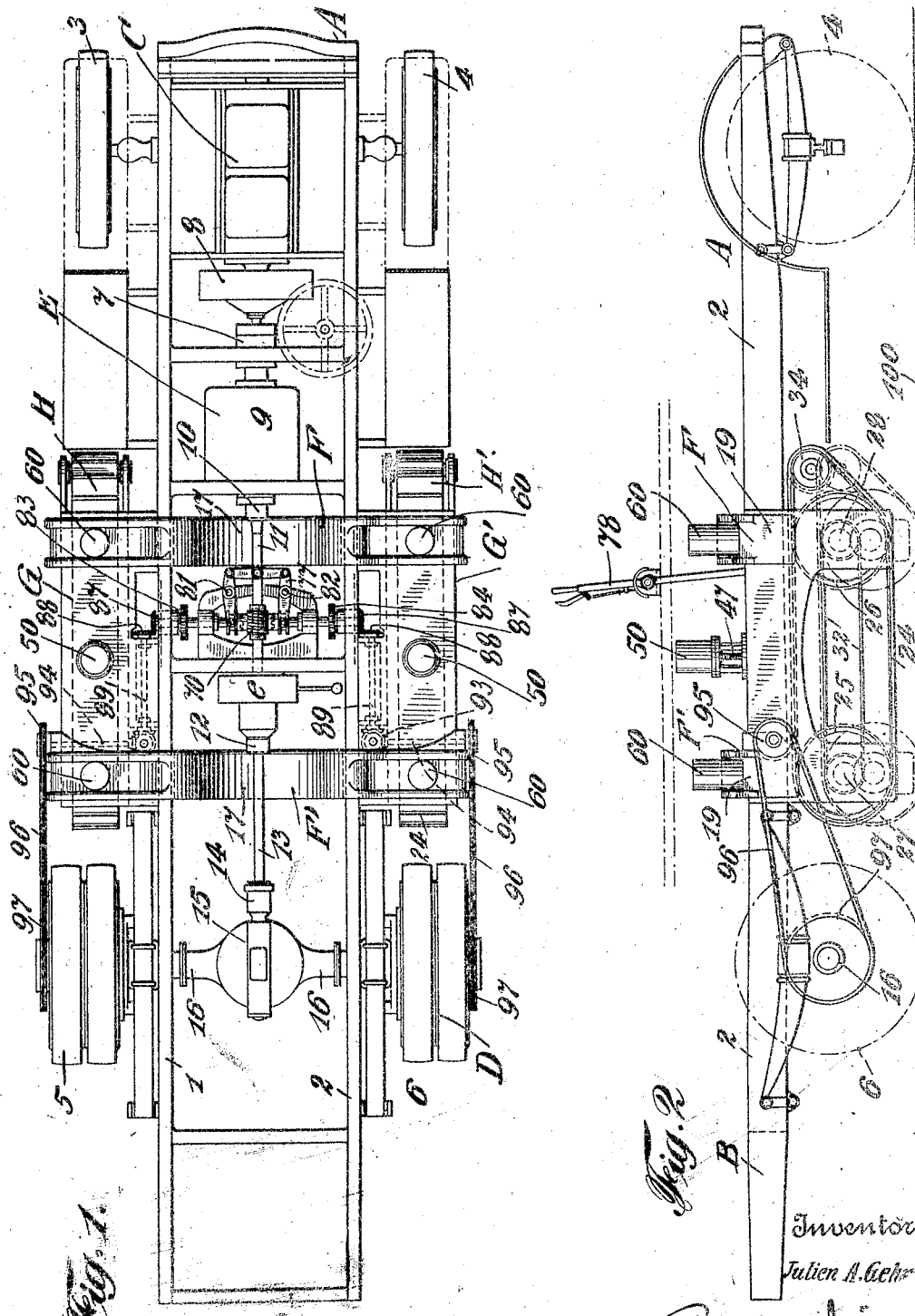

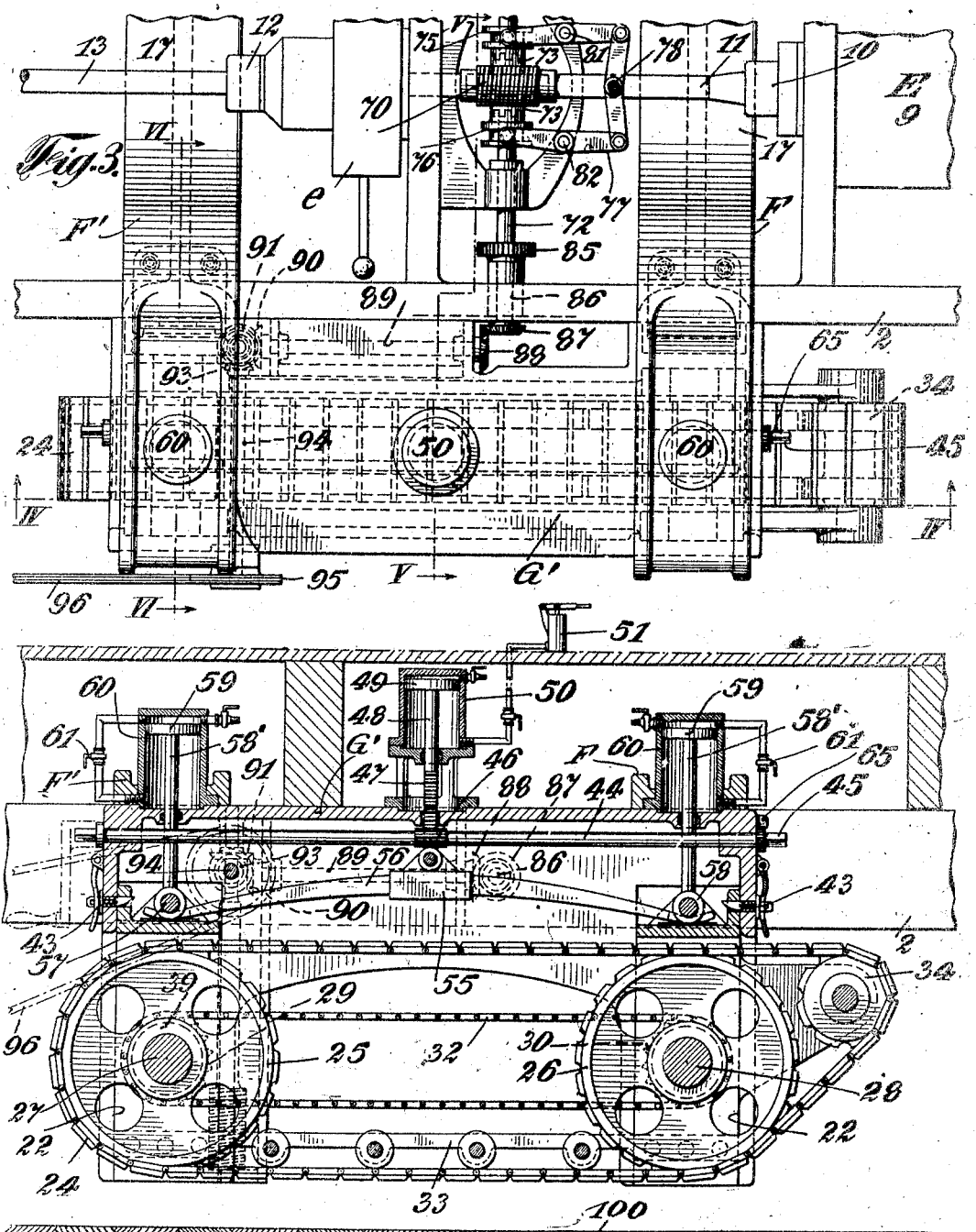

Patented Apr. 21, 1925.

1,534,514

UNITED STATES PATENT OFFICE.

JULIEN A. GEHRUNG, OF NEW YORK, N. Y.

AUTOMOBILE TRUCK.

Application filed September 7, 1922. Serial No. 586,766.

*To all whom it may concern:*

Be it known that I, JULIEN A. GEHRUNG, a citizen of the United States, and a resident of the county of New York and State of New York, have invented certain new and useful Improvements in Automobile Trucks, set forth in the following specification.

This invention relates to automobile trucks.

The object of the invention is to overcome the difficulty of traction usually present in a wheel-driven motor truck on slippery ground. More particularly, an object of the invention is to combine in a standard automobile truck of the type having four or more wheels and including a pair of wheels at the rear and a pair of wheels at the front materially spaced forwardly of the rear wheels, a pair of chain tread tractors located one on each side of the truck between the front and the rear wheels.

Further objects of the invention are to provide efficient structural means for combining a pair of such chain-tread tractors with an automobile truck of the type described.

The objects of the invention will be better understood by reference to the illustrative embodiment thereof described in the following specification in connection with the accompanying drawings, which form a part hereof and in which like characters designate corresponding parts in the several figures. The claims are directed to this illustrative embodiment merely for the purposes of illustration and not limitation.

In the drawings, Fig. 1 is a plan view of an automobile truck embodying my invention, the same being shown in part diagrammatically;

Fig. 2 is a side elevation of the structure of Fig. 1;

Fig. 3 is a fractional detail plan drawn to an enlarged scale of a truck embodying my invention;

Fig. 4 is a side elevation of the part shown in Fig. 3 and partly in section along the plane of line IV—IV of Fig. 3;

Figure 5:
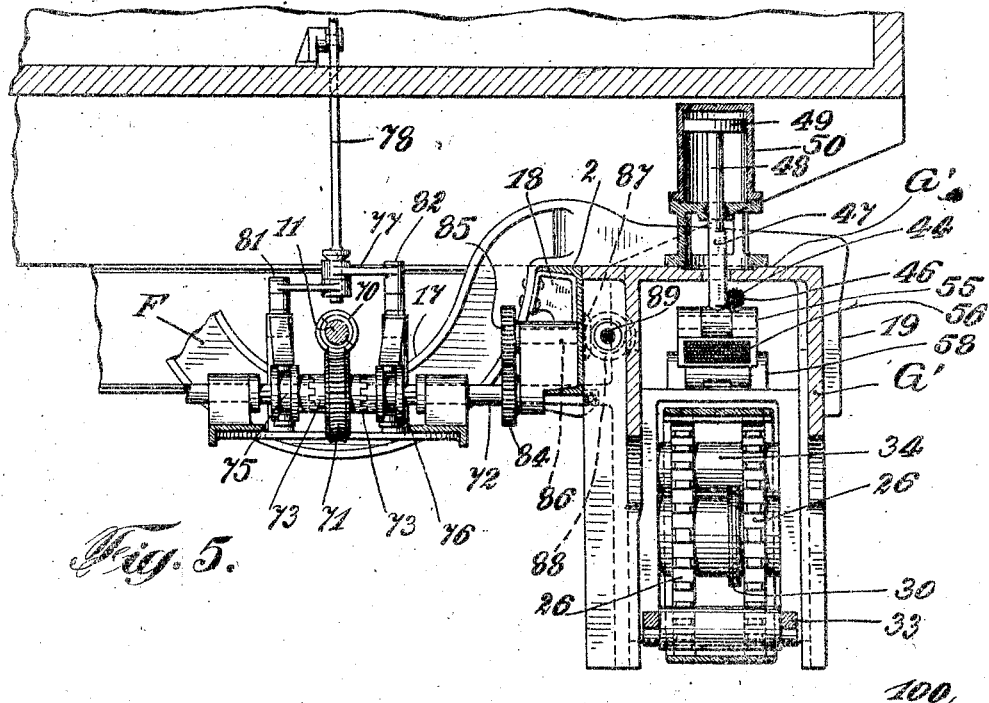
Fig. 5 is a section through the staggered plane of line V—V of Fig. 3.
Figure 6:
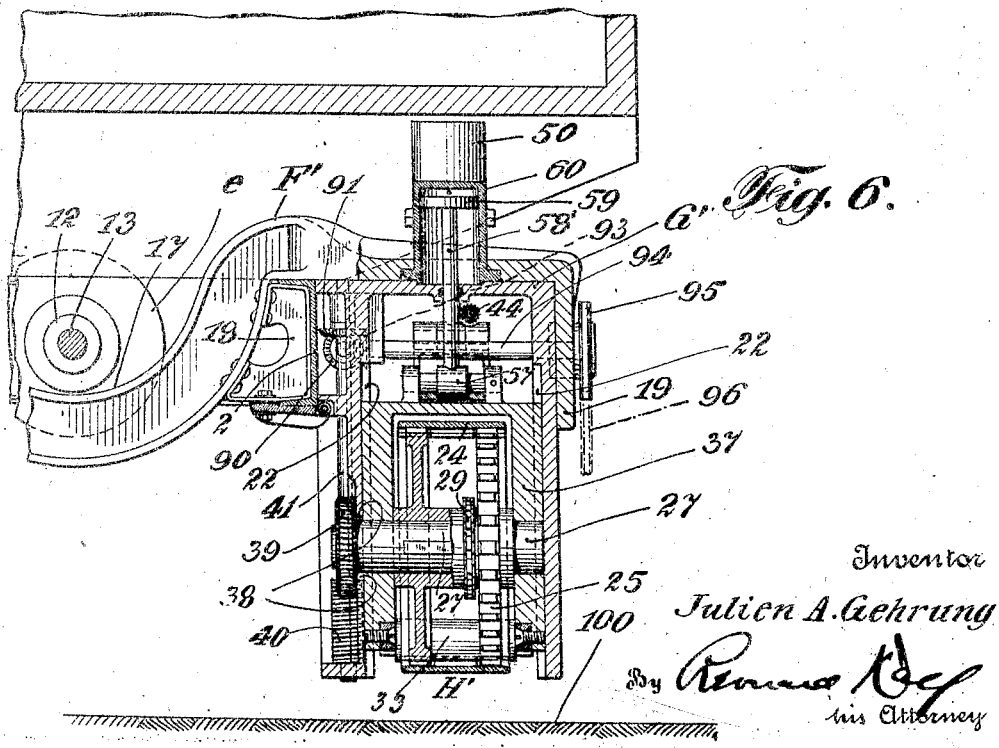
Fig. 6 is a section through the plane of line VI—VI of Fig. 3.

I have shown my invention combined with an automobile truck A of standard commercial construction, which is understood to be merely illustrative of the kind of truck to which the invention is applicable. This truck comprises the chassis B, in which the main side beams are indicated by 1 and 2; the power plant C; the running gear D, consisting of four wheels 3, 4, 5, and 6; and the usual transmission mechanism E operatively connecting the motor with the driving wheels 5 and 6. However, it is to be understood that for some purposes the usual transmission mechanism, which is diagrammatically indicated in the drawings as comprising clutch 7, adjacent fly wheel 8, transmission 9, universal 10, propeller shaft 11, universal 12, propeller shaft 13, universal 14, differential 15, axles 16, may comprise also a secondary or auxiliary clutch e serviceable in disconnecting the regular driving wheels 5 and 6 from the power plant and permitting the control and operation of the tractor mechanism through the usual service clutch and transmission gears of the commercial truck, all as will hereafter more fully appear. It is also to be understood that notwithstanding the fact that the commercial truck illustrated in the drawings is of the shaft drive type, there is nothing in the invention which precludes it being a chain drive type so far as the main features in the invention are concerned.

A pair of transverse truss beams F and F' are shaped preferably as indicated in the drawings with central downwardly sweeping arches 17 to escape the propeller shaft. Filler blocks 18 are provided to take into the channels of the side beams 1 and 2 and by the application of bolts firmly clamp the beams F and F' to the chassis. These beams extend out laterally and are provided with downwardly projecting arms 19 corresponding with the outer planes or confines of the wheels. Rigidly supported in the lateral pockets formed by these transverse beams is a side frame G for the left of the truck and G' for the right of the truck. These side frames provide vertical runways 22 for the chain tread tractors H and H', the usual commercial construction in each comprising a chain tread 24, cooperating twin driving drums 25 and 26 rotating respectively upon axles 27 and 28. These chain-treads 24 are arranged preferably so as to track with the truck wheels. This has a material advantage in that going through the rough ground but one set of tracks have to be flattened down. These drums are interlinked by sprockets 29 and 30 through the medium of sprocket chain 32. The idler bar 33 of the chain tread is of usual construction and in the embodiment illustrated an idler drum 34 for the chain tread is indicated. The axle 27, having bearings on a tractor block casting 37, projects inwardly through a suitable slot 38 in the side frames, and is provided with a driving worm gear 39 meshable with the worm 40 rigidly mounted at the lower end of a vertical drive shaft 41 having bearings in the side frame. In the position indicated in the figures, the worm and worm gear 40 and 39 are out of mesh for the elevated position of the tractor indicated. In its elevated position it may be maintained, if desired, by finger releasable latches 43.

Each tractor in its frame is arranged to be forced upwardly out of contact with the roadway and is likewise arranged to be forcibly held, although resiliently, against the roadway. To this end a longitudinal shaft 44 suitably journaled is fitted at both ends with a head 45 to take the socket of an operating crank. Mid positioned on this shaft is a pinion 46 meshing with a rack 47, the upward continuation of which is a piston rod 48 connected with piston 49 of hydraulic cylinder 50, which may be operated in any approved manner, as by the force pump 51. The cylinder and piston rod constitute an hydraulic jack intended to operate alternatively with the rack and pinion 46, 47, both or either of which serve to draw up the saddle 55 carrying the longitudinal bridge spring 56. The ends of this spring 56 are operatively connected by saddles 57 and 58 with the rear and front ends of each tractor. Each saddle 57 and 58 also is provided with a pneumatic dash pot control, the piston rods 58' of which connect with the pistons 59 working in cylinders 60 under the control of valves 61.

In the structure illustrated, gravity is serviceable in effecting the depression of each tractor into operative engagement with the road-bed. It is, of course, to be understood, however, that should more forcible engagement with the road-bed be desired, it may be effected by the exertion of a downward force upon the rack 47 or piston rod 48. Thus the degree of resilient pressure exerted downwardly by the spring 56 may be regulated and when once regulated a fixing of the position of the shaft 44 by the latch 65 sets the adjustment. When in operation the necessary up and down movement of the tractor to accommodate irregularities in the roadway is resiliently permitted by this spring under the control also of the dash pots.

The preferred manner of effecting the operative driving of the tractors is through the medium of a worm 70 applied to the propeller shaft 11 in the form of a clamp two-part forging. This worm cooperates with an underlying worm gear 71 having an idle bearing upon the transversely journaled shaft 72, the sides 73 of this worm gear being formed as one part of a clutch, the other parts 75 and 76 of which are splined loosely upon the shaft 72 under the engaging and disengaging control of the double toggle 77 operated in any suitable manner, as by the lever 78. The fulcrums of the arms of the double toggle are indicated by 81 and 82. It is preferable, when it becomes necessary to employ the tractors, that the propeller shaft 11 be disconnected from the drive wheels 5 and 6 through the medium of the auxiliary clutch e.

Gears 83 and 84 fixed to shaft 72 drive respectively the left or the right gear 85 on stub shaft 86, which, through the medium of bevel gear 87 meshing with bevel gear 88 drives shaft 89. Shaft 89 extends longitudinally to the rear where it is provided with bevel gear 90 meshing with bevel gear 91 on the vertical shaft 41. The worm gear 40 at the lower end of shaft 41 serves in addition to the driving means for worm gear 39 as a clutch disengageable from the chain-tread tractor when it is elevated to bring the worm and gear 40, 39 out of mesh.

As an auxiliary drive for each tractor or as an alternative method of driving each tractor, provision is made for driving each tractor from the corresponding rear wheel. To this end a bevel gear 93 is shown meshing with the gear 91 and is fixed to the inner end of shaft 94. Shaft 94 extends outwardly through suitable bearings in the side frame and carries at its outer end sprocket 95 to which a sprocket chain 96 may be fitted to be driven from an auxiliary sprocket wheel 97 fitted one to each wheel. Obviously, when this chain drive is employed, the shaft and gear drive from worm 70 may be thrown out of commission by releasing the clutches 75 and 76; or, in fact, if desired, entire reliance may be had upon the chain drive and all of the shaft and gear drive mechanism from the worm 70 may be omitted. The drive of each tractor from its corresponding rear wheel of the truck has the advantage of employing the differential of the truck in the driving of the auxiliary tractors, which facilitates the taking of curves. In whatever manner the tractors are propelled, the gearing for that purpose is selected of such a ratio that the lineal drive of the chain tread is equal to the peripheral drive of the drive wheels 5 and 6. If it is desired to drive the tractors through the medium of the gear and shaft drive of the worm 70, the rear wheels may be disconnected entirely from the power plant by the removal of the sprocket chains 96 and disconnecting clutch e.

It is contemplated within the scope of the invention that the worm gear 71 may be the worm gear of any standard differential construction so as to permit the differential driving of the two side tractors from the worm 70. When the truck is being driven solely by its wheel drive, with the tractors elevated into their carrying position, it is a feature of the structure that the dash pots 60 may serve as pneumatic carriers by closing the valves 61. Functioning thus the latches 43 are not locked or should have play so that the tractor is supported supplementarily on a resilient air cushion. In fact, the inventive thought may have a variety of expressions, especially in the details of its embodiment, all as is contemplated by what I claim and desire to secure by United States Letters Patent as follows:

1. In an automobile truck in combination, a chassis; four wheels, one pair of which are operatively connectable with said power plant; a pair of chain-tread tractors located respectively on opposite sides of said chassis and between a front and a rear wheel; means for forcing said tractors into and out of tractive engagement with the road-bed; through cross-beams extending transversely to the said chassis secured thereto and overhanging said tractors on both sides thereof and serving as the supporting connection between said tractors and said truck and means for operatively connecting said tractors with said power plant.

2. The structure described in claim 1 and further characterized by the fact that each said tractor when tracking on the road-bed is resiliently connected with said chassis.

3. The structure described in claim 1 and further characterized by the fact that the treads of said tractors track respectively substantially with those of the wheels of said truck.

4. The structure described in claim 1 and further characterized by the fact that the lineal tractive movement of said tractors is substantially equal to that of the driving wheels of said truck.

5. In combination with an automobile truck having a chassis and front and rear wheels, of a pair of rigid side frames located each between a front and a rear wheel; a pair of chain-tread tractors, each guided for vertical movement in and held against transverse and longitudinal movement by one of said side frames; and a set of through cross-beams for mounting said tractors and extending the full width across the chassis of said truck out on both sides into the plane of the wheels thereof.

6. In combination with an automobile truck having a chassis and front and rear wheels, of a pair of rigid side frames located each between a front and a rear wheel; and a pair of chain-tread tractors each guided for vertical movement in and held against transverse and longitudinal movement by one of said side frames; and means for resiliently and forcibly restraining each said tractor in a depressed position in each said side frame; and a set of through cross-beams for mounting said tractors and extending the full width across the chassis of said truck out of both sides into the plane of the wheels thereof.

In witness whereof I have hereunto set my hand this 18th day of August, 1922.

JULIEN A. GEHRUNG.